(No Model.)
D. LANE.
CATTLE STANCHION.
No. 399,620. Patented Mar. 12, 1889.
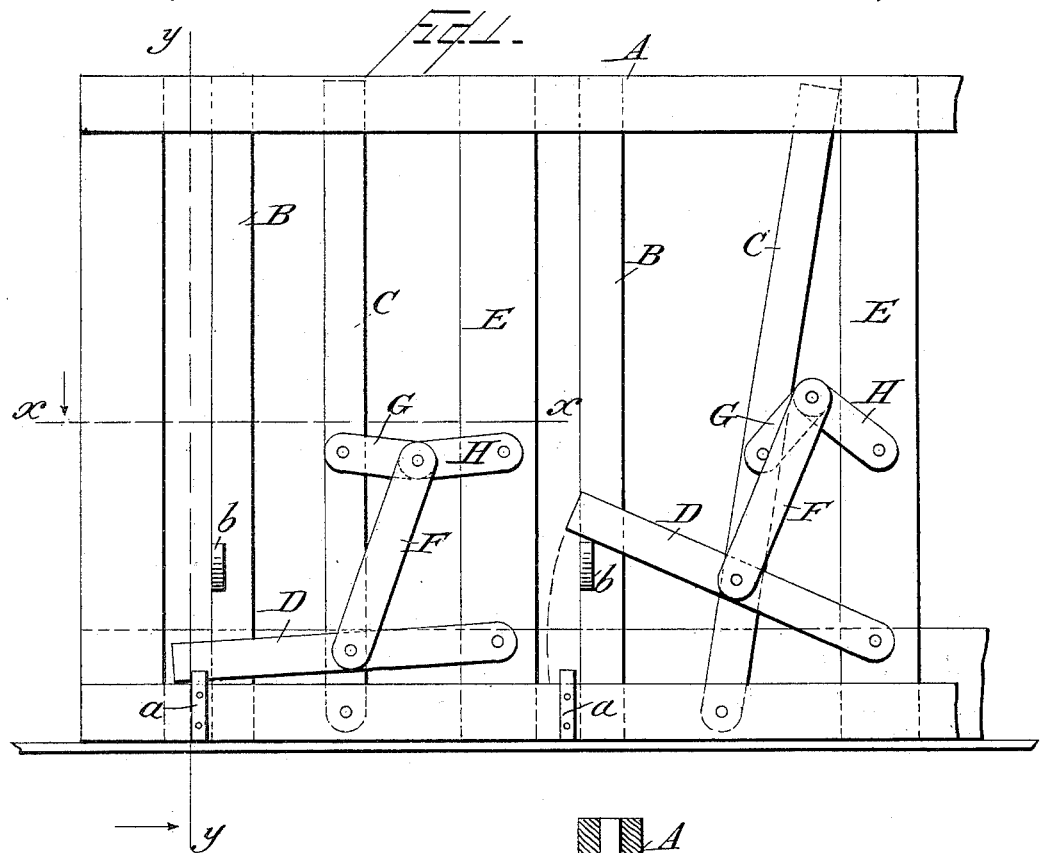
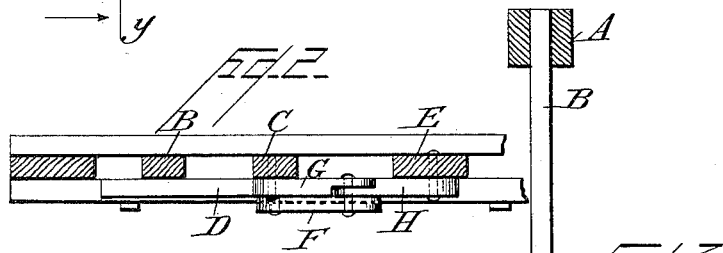
Witnesses,
F. H. Schott
Thad. E. Tasker
Inventor,
David Lane
John C. Tasker
Attorney.

UNITED STATES PATENT OFFICE.

DAVID LANE, OF HAYT'S CORNERS, NEW YORK.

CATTLE-STANCHION.

SPECIFICATION forming part of Letters Patent No. 399,620, dated March 12, 1889.

Application filed October 8, 1888. Serial No. 287,465. (No model.)

*To all whom it may concern:*

Be it known that I, DAVID LANE, a citizen of the United States, residing at Hayt's Corners, in the county of Seneca and State of New York, have invented certain new and useful Improvements in Self-Fastening Cattle-Stanchions; and I do hereby declare the following to be a full, clear, and exact description of the invention, such as will enable others skilled in the art to which it appertains to make and use the same.

This invention relates to an improvement in cattle-stanchions, the object thereof being to construct the stanchion in such a manner that the cow or other animal may by its own movements, after entering the stall, cause the stanchion to become automatically fastened; and the invention consists, essentially, in the construction, arrangement, and combination of parts, substantially as will be hereinafter described and claimed.

In the accompanying drawings, illustrating my invention, Figure 1 is a front elevation of the frame-work of a couple of cattle-stalls, and shows my improved self-fastening cattle-stanchion applied thereto, the stanchion in the left of the figure being shown in the closed position and that in the right of the figure being indicated in the open position ready to receive the head of the animal. Fig. 2 is a horizontal sectional plan on the line $x$ $x$ of Fig. 1. Fig. 3 is a vertical cross-section on the line $y$ $y$ of Fig. 1, and shows the position of the animal within the stall.

Similar letters of reference designate corresponding parts throughout the several figures.

A denotes any suitable frame-work in a barn, stable, or other building for forming the front portion of a couple of cattle-stalls in said building, the beams and other parts of this frame-work being illustrated here in a general manner and by way of example only, as my improved stanchions are adapted for use with various kinds of cattle-stalls.

B denotes the fixed stanchion-post, which is held at top and bottom in the frame-work A. Parallel to the vertical bar B is the movable stanchion C, which is pivoted at its lower end in the frame-work, as shown, so as to be movable toward and away from the fixed bar B, thus enabling it to occupy either the position shown in the right hand of Fig. 1 or that shown in the left hand of said figure. In the right hand of Fig. 1 the bars B and C are separated a sufficient distance to allow the cow or other animal to easily pass its head between the bars. In the left of Fig. 1 the bars are shown in what may be termed the "locked" position, where they are sufficiently far apart to allow the animal to stand with his neck comfortably between the bars, but not far enough apart to allow him to withdraw his head. When the bars are in this position, therefore, the animal is securely fastened or tied and cannot leave the stall.

Pivoted to some suitable part of the frame-work A—as, for instance, the upright beam E—is a horizontal lever, D. Two short levers, G and H, pivoted together at one end, are pivoted at their other ends, respectively, to the movable stanchion-bar C and the upright E. A connecting-rod, F, is fastened pivotally to the lever D near its middle point, and also is pivoted at its other end at the junction of the short levers G and H.

It will be readily seen from a consideration of this construction and arrangement of levers that when the lever D is lifted the movable stanchion-bar C will be moved from its vertical position, as shown in the left of Fig. 1, to its inclined position, as shown in the right of Fig. 1, and, furthermore, that when the lever D drops a reverse operation will take place, and the stanchion-bar C will move back again into its upright position. The fixed post B is provided at a suitable point with a projection or lug, $b$, upon which the free end of the lever D may rest after it has been lifted, as aforesaid, for the purpose of widening the distance between the posts B and C; also, I preferably provide the lower part of the frame-work A, at a point adjacent to the bottom end of the post B, with a short upwardly-projecting pin, $a$, so that when the lever D drops it may be held securely against lateral displacement between the pin $a$ and the post B.

In addition to the foregoing description of the structure and arrangement of the several parts of my improved self-fastening cattle-stanchion only a word of description will be necessary to fully explain its operation. Suppose, for instance, that the posts B and C are located as shown in the right of Fig. 1, the lever D resting upon the lug b. If, now, the animal which is to be tied up enters the stall and places its head forward between the posts B and C, in order to reach the manger, which is placed in front of the stall, as shown in Fig. 3, his neck will push sufficiently upon the lever D to knock it off from its supporting-lug and cause it to drop, the downward motion thereof being assisted by the movements of the animal's neck in his endeavor to reach the fodder that lies before him. Thus by the downward motion of the lever D the movable stanchion-bar C will be caused to assume its upright position, whereupon the short levers G and H, together with the connecting-rod F, will be so relatively arranged as to serve as a lock and prevent any further movements on the part of the animal from again inclining the movable stanchion-bar. The animal will therefore be securely held until released by the lifting of the lever D. In this manner and by means of this arrangement of parts I provide a simple, convenient, and serviceable self-fastening cattle-stanchion, which is simple of construction, and by which cattle can be securely tied up.

Having thus described my invention, what I claim as new, and desire to secure by Letters Patent, is—

1. In a self-fastening cattle-stanchion, the combination of the fixed stanchion-bar, the movable stanchion-bar pivoted at its lower end, the horizontal lever located transversely to said bars and in a position to be acted upon by the animal, the interpivoted short levers, one of which is pivoted to the movable bar and the other to the stationary frame, and the connecting-rod between the interpivoted levers and the horizontal lever, all arranged substantially as described.

2. In a self-fastening cattle-stanchion, the combination of the stationary post B, pivoted bar C, the lever D, located transversely to bars B and C, the interpivoted short levers G H, one of which is pivoted to the bar C and the other to the stationary frame, and the connecting-rod F between the interpivoted levers and the lever D, all arranged substantially as described.

3. The combination of the stationary bar B, having a lug, b, the pivoted bar C, the pivoted lever D, located across the two bars B and C, the short levers G and H, lever F, pivoted at the junction of said levers and to the lever D, and the frame-work A, having the projecting pin a, all arranged substantially as described.

In testimony whereof I affix my signature in presence of two witnesses.

DAVID LANE.

Witnesses:
FRANCIS C. ALLEN,
CHAS. D. BECKER.